(12) United States Patent
Muninder et al.

(10) Patent No.: US 9,251,588 B2
(45) Date of Patent: Feb. 2, 2016

(54) METHODS, APPARATUSES AND COMPUTER PROGRAM PRODUCTS FOR PERFORMING ACCURATE POSE ESTIMATION OF OBJECTS

(75) Inventors: Veldandi Muninder, Bangalore (IN);
Mithun Uliyar, Bangalore (IN);
Basavaraja S V, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 70 days.

(21) Appl. No.: 14/127,272

(22) PCT Filed: May 3, 2012

(86) PCT No.: PCT/FI2012/050426
§ 371 (c)(1),
(2), (4) Date: Feb. 12, 2014

(87) PCT Pub. No.: WO2012/175785
PCT Pub. Date: Dec. 27, 2012

(65) Prior Publication Data
US 2015/0010203 A1    Jan. 8, 2015

(30) Foreign Application Priority Data

Jun. 20, 2011 (IN) .......................... 2077/CHE/2011

(51) Int. Cl.
*G06K 9/00* (2006.01)
*G06T 7/00* (2006.01)
*G06K 9/62* (2006.01)

(52) U.S. Cl.
CPC .......... *G06T 7/0042* (2013.01); *G06K 9/00241* (2013.01); *G06K 9/00288* (2013.01); *G06K 9/6232* (2013.01); *G06T 7/0046* (2013.01); *G06T 2207/30201* (2013.01)

(58) Field of Classification Search
None
See application file for complete search history.

(56) References Cited

U.S. PATENT DOCUMENTS

| 7,391,888 B2* | 6/2008 | Hu et al. ....................... 382/118 |
| 7,848,548 B1 | 12/2010 | Moon et al. |
| 2001/0028731 A1 | 10/2001 | Covell et al. |
| 2001/0053292 A1* | 12/2001 | Nakamura .................... 396/661 |
| 2002/0089516 A1* | 7/2002 | Sobol ................... H04N 1/2104 345/620 |

(Continued)

FOREIGN PATENT DOCUMENTS

EP    2234062 A1    9/2010
WO    2012/078167 A1    6/2012

OTHER PUBLICATIONS

Park, "Face Recognition: Face in Video, Age Invariance, and Facial Marks", Dissertation, 2009, 158 pages.

(Continued)

*Primary Examiner* — Aaron W Carter
(74) *Attorney, Agent, or Firm* — Alston & Bird LLP

(57) ABSTRACT

An apparatus for determining a pose(s) of an object(s) may include a processor and memory storing executable computer code causing the apparatus to at least perform operations including receiving a detected image of at least one face and analyzing the image of the at least one face based on data of at least one model identifying one or more poses. The poses may be related in part to at least one of a position or an orientation of respective faces. The computer program code may further cause the apparatus to determine that the face corresponds to one of the poses based in part on one or more items of data of the image passing criteria identified by the model as corresponding to the pose. Corresponding methods and computer program products are also provided.

20 Claims, 9 Drawing Sheets

(56) References Cited

U.S. PATENT DOCUMENTS

| | | | |
|---|---|---|---|
| 2005/0105780 A1 | 5/2005 | Ioffe | |
| 2006/0204110 A1 | 9/2006 | Steinberg et al. | |
| 2007/0036431 A1 | 2/2007 | Terakawa | |
| 2007/0172126 A1* | 7/2007 | Kitamura | 382/190 |
| 2007/0258645 A1* | 11/2007 | Gokturk et al. | 382/190 |
| 2007/0292019 A1* | 12/2007 | Terakawa | G06K 9/3208 382/159 |
| 2008/0256130 A1 | 10/2008 | Kirby et al. | |
| 2009/0003652 A1* | 1/2009 | Steinberg | G06K 9/00228 382/103 |
| 2009/0086050 A1* | 4/2009 | Kasakawa | 348/222.1 |
| 2010/0166317 A1 | 7/2010 | Li et al. | |
| 2011/0050656 A1* | 3/2011 | Sakata et al. | 345/204 |
| 2011/0052013 A1* | 3/2011 | Sasahara et al. | 382/118 |
| 2011/0298702 A1* | 12/2011 | Sakata et al. | 345/156 |
| 2012/0108179 A1 | 5/2012 | Kasslin et al. | |
| 2013/0002551 A1* | 1/2013 | Imoto et al. | 345/158 |
| 2013/0182918 A1* | 7/2013 | Kovtun et al. | 382/118 |
| 2013/0343647 A1* | 12/2013 | Aoki | 382/165 |

OTHER PUBLICATIONS

Ma et al., "Robust Head Pose Estimation Using LGBP", International Conference on Pattern Recognition, vol. 2, 2006, 4 Pages.

Extended European Search Report received for corresponding European Patent Application No. 12802758.8, dated Feb. 23, 2015, 8 pages.

Yang et al.,"2D-3D Face Matching Using CCA", IEEE International Conference on Automatic Face & Gesture Recognition, Sep. 17-19, 2008, 6 Pages.

International Search Report and Written Opinion received for corresponding Patent Cooperation Treaty Application No. PCT/FI2012/050426, dated Oct. 18, 2012, 13 pages.

Foytik J. et al., "Head Pose Estimation From Images Using Canonical Correlation Analysis", IEEE 39th Applied Imagery Pattern Recognition Workshop, Oct. 13, 2010, 8 pages.

Murphy-Chutorian et al., "Head Pose Estimation in Computer Vision: A Survey", IEEE Transactions on Pattern Analysis and Machine Intelligence, Apr. 1, 2009, 20 pages.

* cited by examiner

METHODS, APPARATUSES AND COMPUTER PROGRAM PRODUCTS FOR PERFORMING ACCURATE POSE ESTIMATION OF OBJECTS

RELATED APPLICATION

This application was originally filed as Patent Cooperation Treaty Application No. PCT/FI2012/050426 filed May 3, 2012 which claims priority benefit to Indian Patent Application No. 2077/CHE/2011, filed Jun. 20, 2011.

TECHNOLOGICAL FIELD

An example embodiment of the invention relates generally to image processing and, more particularly relates to a method, apparatus, and computer program product for determining a pose of one or more objects.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to services for performing image processing. In this regard, for example, improving the reliability of accurately determining a pose of one or more objects in an image or video may enhance image processing.

At present, a pose of a detected object may be performed by pose based object detectors. Although a conventional pose based object detector may detect and classify a specific pose of an object, the chance of conventional pose based object detectors detecting a pose incorrectly may be higher than desirable. This is typically because training of a classifier of a pose is generally performed by using many samples of a same pose in which the variations in the samples may be huge due to irregularities in cropping, and/or feature selection may not be robust enough to effectively represent a pose of an object.

In particular, conventional pose based object detectors may encounter problems in pose detection in instances associated with border faces, errors due to process of detection, cropping irregularities, etc. For instance, by utilizing conventional pose based detectors, the discrimination between two poses may typically be less at the border. For example, faces at the edge of an image may be more difficult to detect. As such, pose detection of these border faces utilizing conventional approaches often result in pose detection error. Additionally, conventional posed based detectors may encounter errors due to process of detection. For instance, if a scanning window encloses a partial frontal face, in an instance in which the scanning window should enclose the full face, the conventional pose based detectors oftentimes determine that a detected face corresponds to a half profile pose (e.g., yaw<45 degrees) instead of a frontal pose of the face, due to the view in the window being closer to a half profile than a frontal profile. This may be due to the inherent nature of window scanning. Moreover, by utilizing conventional pose based detectors, errors in pose detection may occur due to one or more cropping irregularities of an image.

In view of the foregoing drawbacks, it may be beneficial to provide a mechanism for efficiently and reliably determining a pose of one or more detected objects.

BRIEF SUMMARY

A method, apparatus and computer program product are therefore provided for determining the pose of an object in an efficient and reliable manner. In this regard, an example embodiment may utilize a pose estimator module to detect a pose(s) of a face(s). The pose may be estimated or determined based on a single image of a detected face. The detected face may be provided to multiple models corresponding to different poses. In an example embodiment, in response to determining that the detected face passes criteria for each model, a confidence value (e.g., a score) may be determined for each of the models. A correct pose of the detected face may be determined to correspond to a respective pose of a model having the highest confidence value.

In another example embodiment, a pose of a detected face may be estimated or determined based in part on analyzing multiple generated images of the detected face. In this regard, an example embodiment may provide an image of a detected face to a multiple face generation module which may generate multiple face images (e.g., image samples) based on performing row shifts, column shifts and the like of pixels of the detected face. The face images may be input to multiple models in which each model may correspond to a different pose. In this example embodiment, a pose associated with a respective model having a highest number of successfully passed candidate face images may be determined to be the pose of the detected face.

In another example embodiment, a pose of a detected face may be estimated or determined based in part on multiple generated face images by utilizing a single classification model (e.g., a CCA model) which may output multiple items of data (e.g., determined data). In this regard, an image of a detected face may be provided to a multiple face generation module which may generate multiple face images based on performing row shifts, column shifts and the like on pixels of the detected face. These generated face images may be input to the same model (e.g., the single classification model) which may generate a decision in the form of a pose for each of the face images. The highest number of generated face images (also referred to herein as highest number of votes) assigned to the same pose may be considered to be the actual pose of the detected face.

In another example embodiment, a pose of an object may be estimated or determined based on multiple images of a detected face by utilizing a confidence model. In this regard, an image of the detected face may be provided to a multiple face generation module which may generate multiple face images based on row shifts, column shifts and the like of pixels of the detected face. Each of the multiple generated face images may be input to multiple models in which each model may correspond to a different pose. In this regard, a confidence of each generated face image that passes criteria for the respective models may be determined. The pose of the detected face may be determined to correspond to a pose associated with a respective model that is determined to have a maximum confidence value.

In one example embodiment, a method for determining one or more poses of one or more objects is provided. The method may include receiving a detected image of at least one face. The method may further include analyzing the image of the face based on data of at least one model. The model may identify one or more poses related in part to a position or an orientation of respective faces. The method may further include determining that the face corresponds to one of the poses based in part on one or more items of data of the image passing criteria identified by the model as corresponding to the pose.

In another example embodiment, an apparatus for determining one or more poses of one or more objects is provided. The apparatus may include a processor and memory including computer program code. The memory and the computer program code are configured to, with the processor, cause the apparatus to at least perform operations including receiving a detected image of at least one face. The computer program code may further cause the apparatus to analyze the image of the face based on data of at least one model. The model may identify one or more poses related in part to a position or an orientation of respective faces. The computer program code may further cause the apparatus to determine that the face corresponds to one of the poses based in part on one or more items of data of the image passing criteria identified by the model as corresponding to the pose.

In another example embodiment, a computer program product for determining one or more poses of one or more objects is provided. The computer program product includes at least one computer-readable storage medium having computer-executable program code portions stored therein. The computer-executable program code instructions may include program code instructions configured to facilitate receipt of a detected image of at least one face. The program code instructions may also be configured to analyze the image of the face based on data of at least one model. The model may identify one or more poses related in part to a position or an orientation of respective faces. The program code instructions may also be configured to determine that the face corresponds to one of the poses based in part on one or more items of data of the image passing criteria identified by the model as corresponding to the pose.

In another example embodiment, an apparatus for determining one or more poses of one or more objects is provided. The apparatus may include means for receiving a detected image of at least one face. The apparatus may also include means for analyzing the image of the face based on data of at least one model. The model may identify one or more poses related in part to a position or an orientation of respective faces. The apparatus may also include means for determining that the face corresponds to one of the poses based in part on one or more items of data of the image passing criteria identified by the model as corresponding to the pose.

Some example embodiments may provide a better user experience by facilitating improvements and reliability in determining the pose of one or more objects. As such, device users may enjoy improved capabilities with respect to services and applications associated with accurately estimating a pose of an object(s).

BRIEF DESCRIPTION OF THE SEVERAL VIEWS OF THE DRAWINGS

Figure 1:
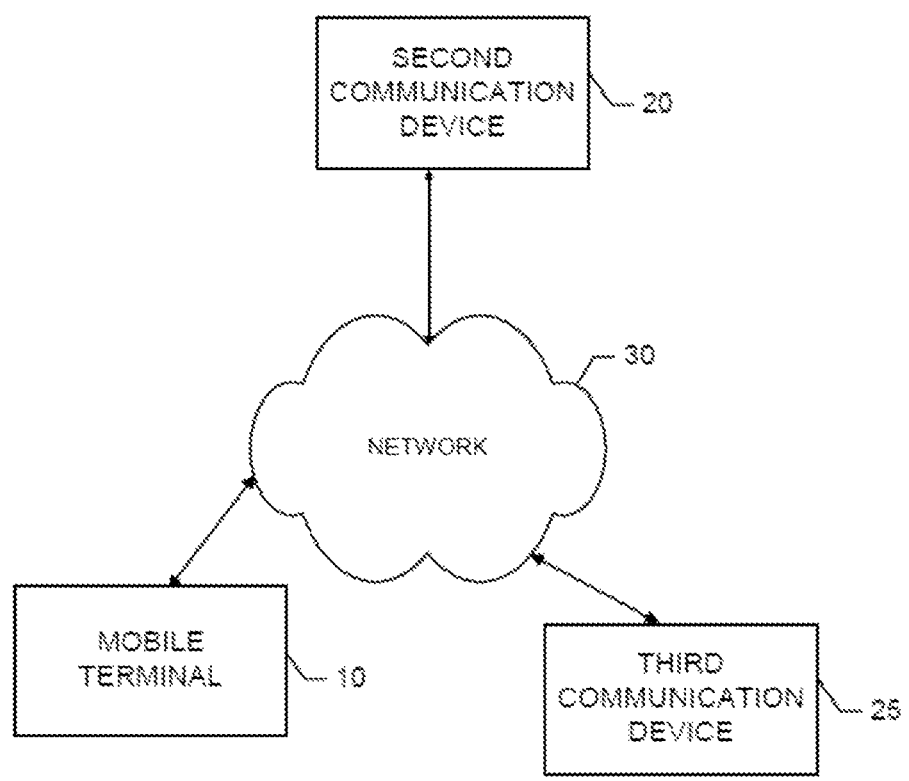
Figure 2:
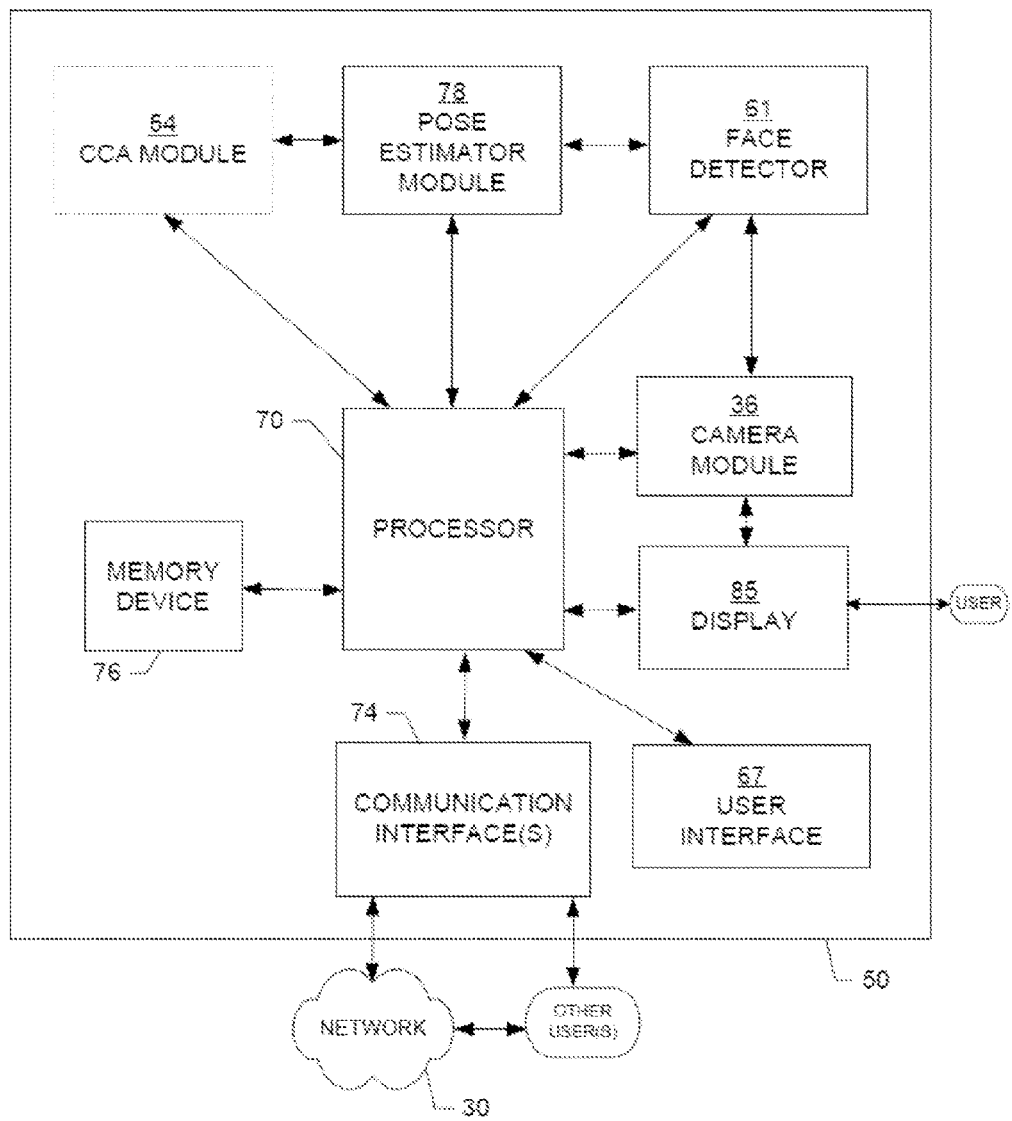
Figure 3:
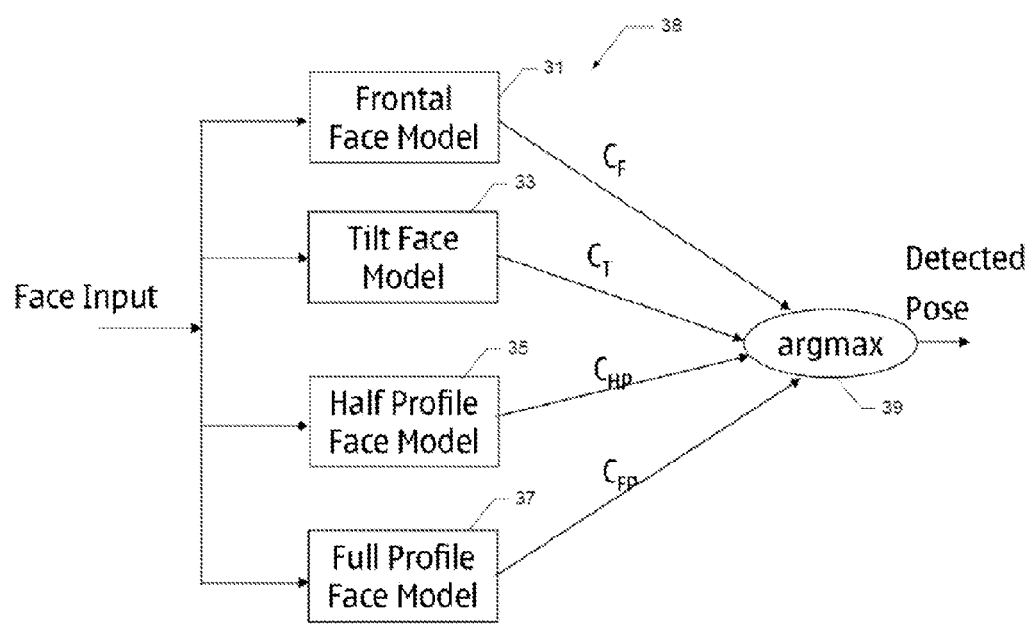
Figure 4:
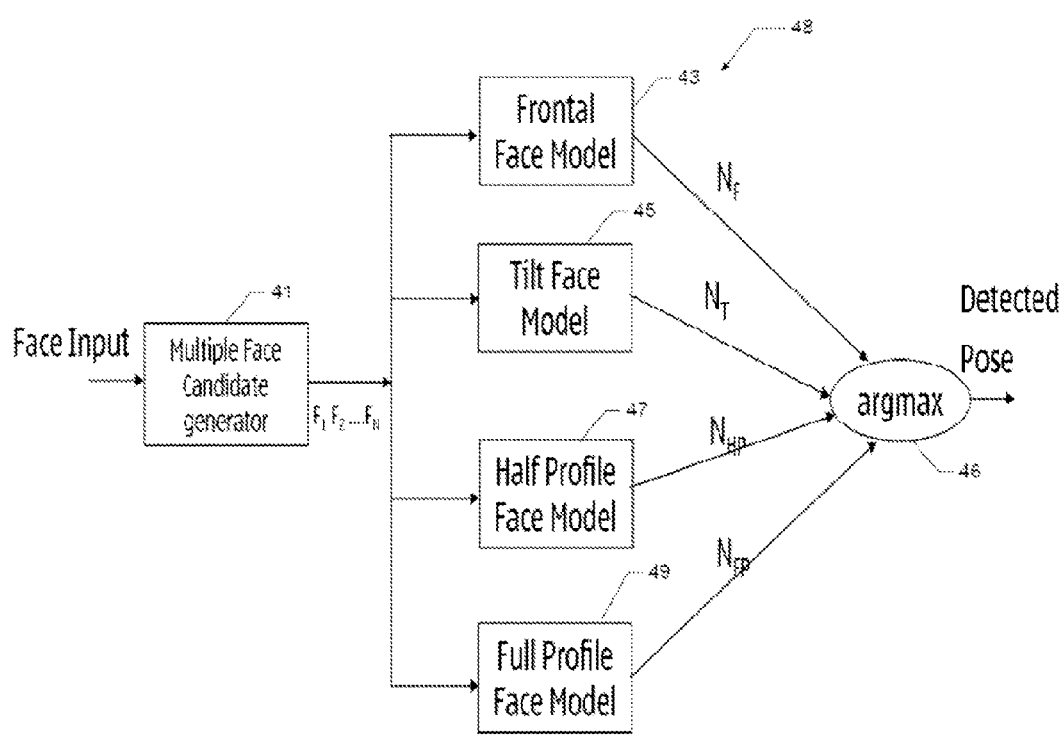
Figure 5:
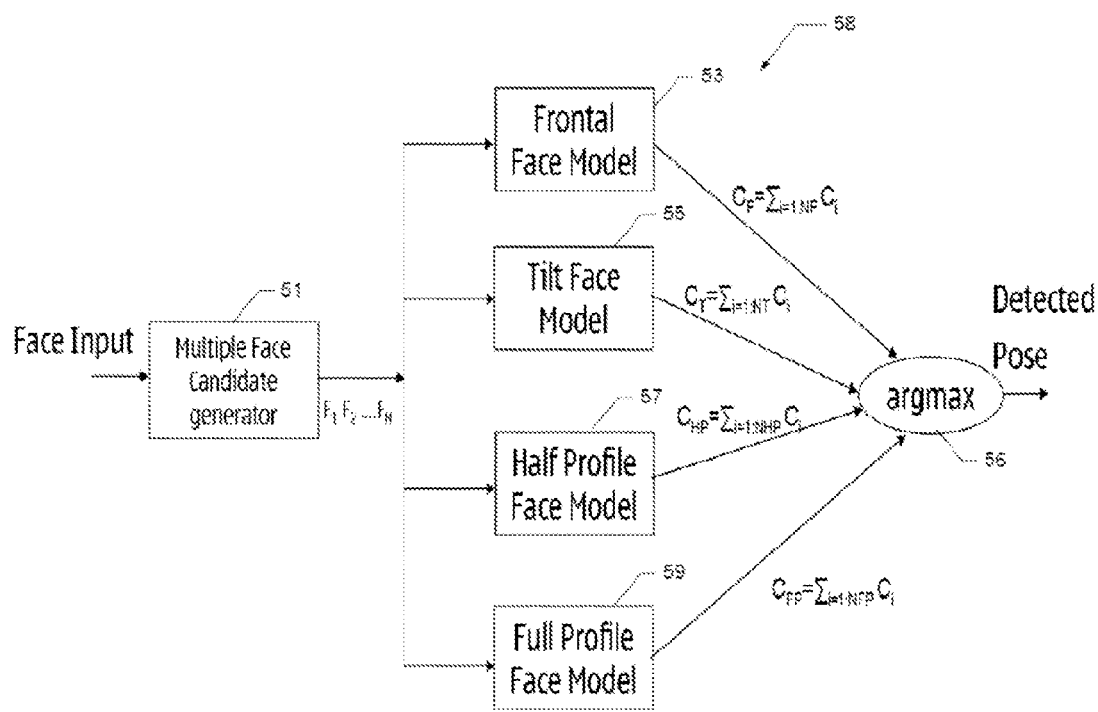
Figure 6:
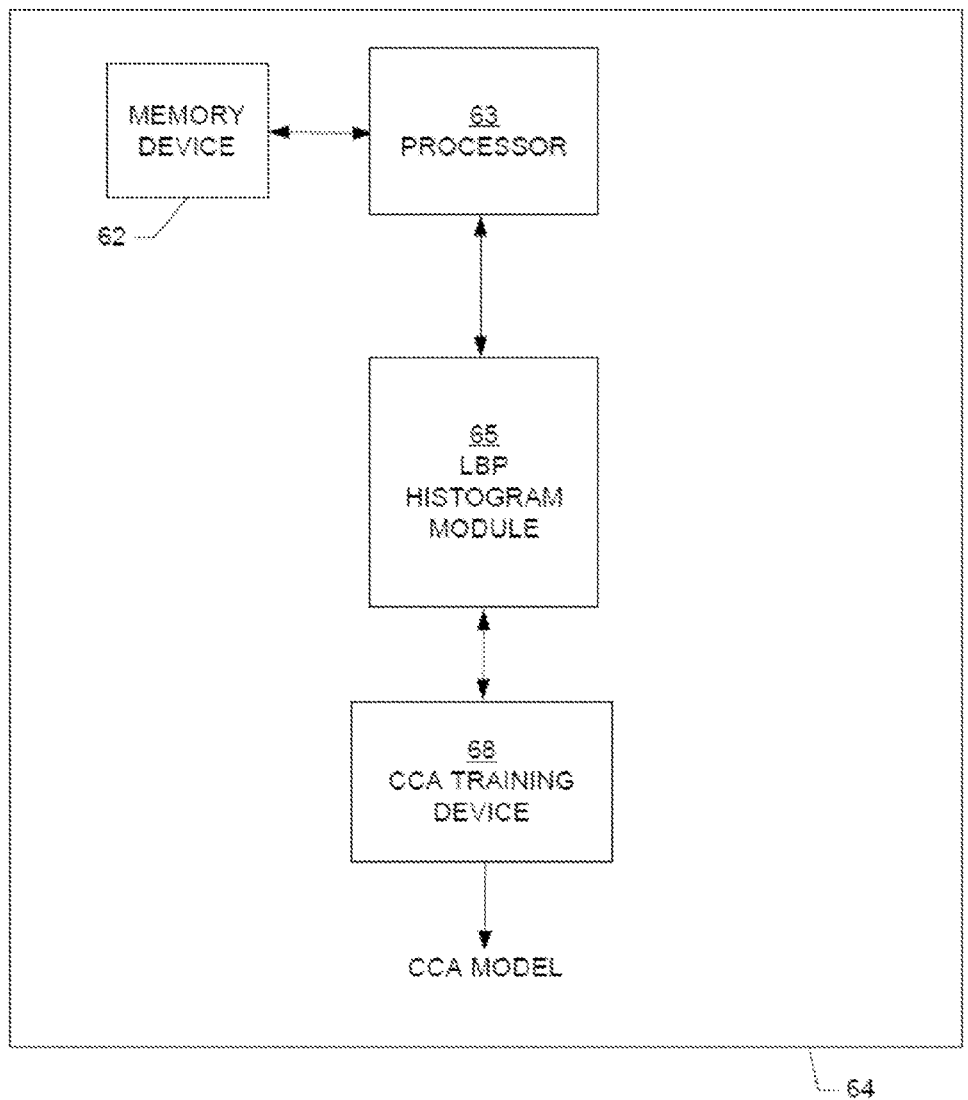
Figure 7:
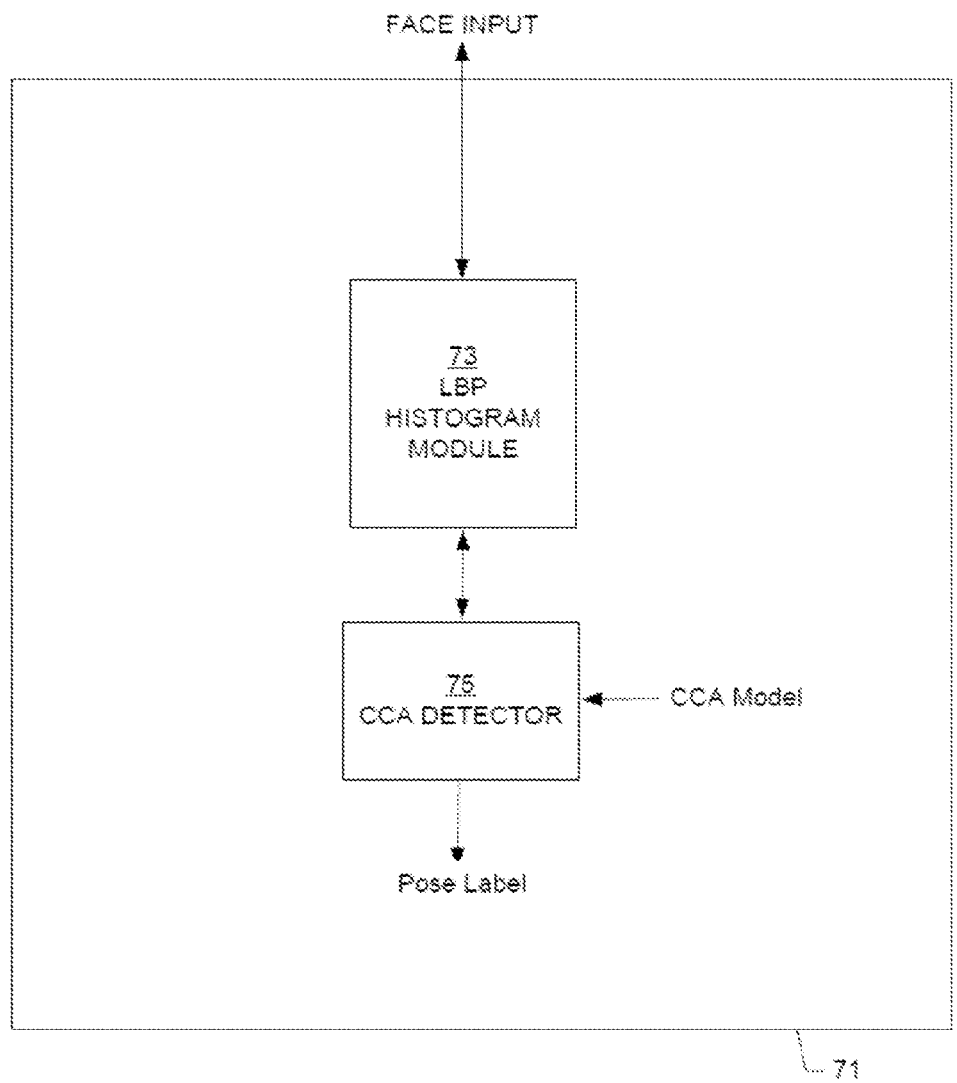
Figure 8:
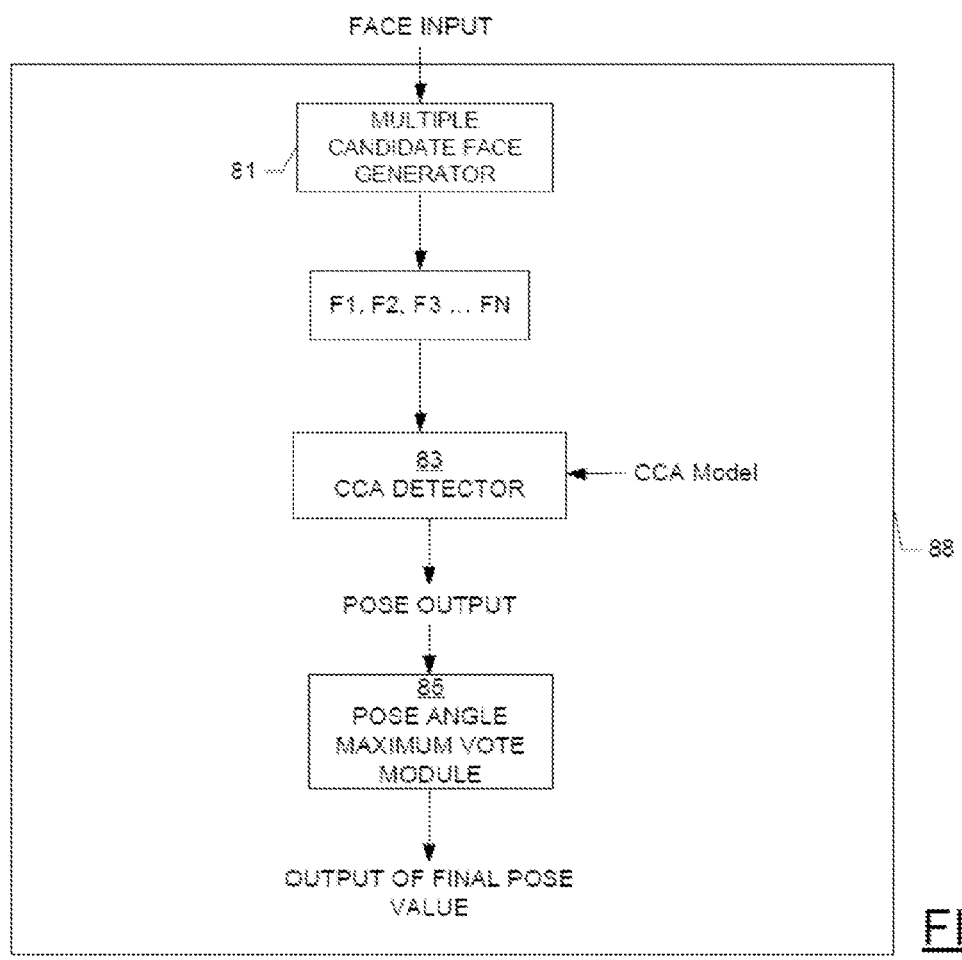
Figure 9:
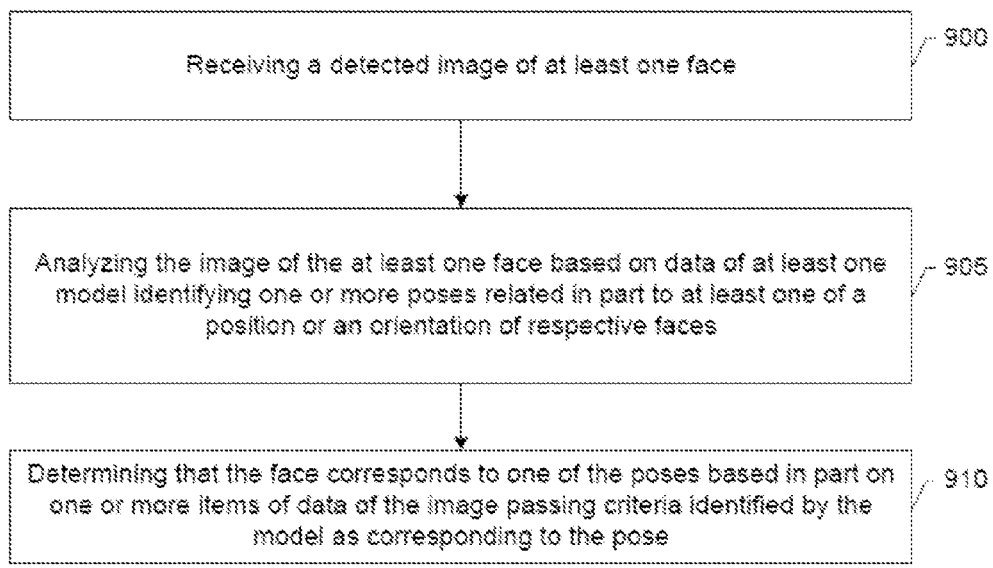

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIGS. 3-5 are schematic block diagrams of devices for determining one or more poses of one or more objects according to an example embodiment of the invention;

FIG. 6. is a schematic block diagram of an apparatus for generating a Canonical Correlation Analysis (CCA) model according to example embodiments of the invention;

FIG. 7 is a schematic block diagram of an apparatus for determining one or more poses of an object based in part on the CCA model according to an example embodiment of the invention;

FIG. 8 is a schematic block diagram of an apparatus for determining one or more poses of one or more objects based in part on the CCA model according to another example embodiment of the invention; and FIG. 9 illustrates a flowchart for determining one or more poses of one or more objects according to an example embodiment of the invention.

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (for example, volatile or non-volatile memory device), may be differentiated from a "computer-readable transmission medium," which refers to an electromagnetic signal.

As referred to herein a "pose(s)" may, but need not, refer to one or more positions and/or orientations of an object(s) (e.g., a face(s)) of an image(s) (e.g., a detected image).

As defined herein a "frontal", "frontal pose(s)" and similar terms may refer to a detected upright face(s) with 0 degrees and multiples of 90 degrees roll and a "tilt", "tilt pose(s)", "titled pose(s)" and similar terms may refer to a detected upright face with multiples of 45 degrees roll. Additionally, as defined herein a "half profile(s)", "half profile pose(s)" and similar terms may refer to a detected upright face with a yaw less than 45 degrees (e.g., yaw<45 degrees). Moreover, a "full profile(s)", "full profile pose(s)" and similar terms may refer to a detected face with a yaw greater than 45 degrees but with a yaw less than 90 degrees (e.g., yaw>45 degrees and yaw<90 degrees).

FIG. 1 illustrates a generic system diagram in which a device such as a mobile terminal 10 is shown in a communication environment according to some example embodiments. As shown in FIG. 1, a system in accordance with some example embodiments may include a first communication device (for example, mobile terminal 10) and a second communication device 20 capable of communication with each other via a network 30. In some cases, embodiments of the present invention may further include one or more additional communication devices, one of which is depicted in FIG. 1 as a third communication device 25. In some embodiments, not all systems that employ an embodiment of the present invention may comprise all the devices illustrated and/or described herein. While example embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) and/or Global Navigation Satellite System (GLONASS) devices, Bluetooth headsets, Universal Serial Bus (USB) devices or any combination of the aforementioned, and other types of voice and text communications systems, can readily employ embodiments of the present invention. Furthermore, devices that are not mobile, such as servers and personal computers may also readily employ embodiments of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. According to some example embodiments the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. According to some example embodiments, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Wi-Fi Network, a Metropolitan Area Network (MAN), and/or a Wide Area Network (WAN), such as the Internet. In turn, other devices such as processing elements (for example, personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore the mobile terminal 10 and the second and third communication devices 20 and 25 may communicate in accordance with, for example, Radio Frequency (RF), Cellular, Near Field Communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

According to some example embodiments, the first communication device (for example, the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

According to some example embodiments, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

According to some example embodiments, the mobile terminal as well as the second and third communication devices 20 and 25 may employ an apparatus (for example, apparatus of FIG. 2) capable of functioning according to example embodiments of the invention.

FIG. 2 illustrates a schematic block diagram of an apparatus for determining a pose of one or more objects according to an example embodiment. Some example embodiments of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, some embodiments of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in some embodiments.

Referring now to FIG. 2, the apparatus 50 may include or otherwise be in communication with a processor 70, a user interface 67, a communication interface 74, a memory device 76, a display 85, a camera module 36, a face detector 61, a pose estimator module 78 and optionally a Canonical Correlation Analysis (CCA) module 54. According to some example embodiments, the display 85 may be a touch screen display. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In some embodiments, the memory device 76 may be a tangible memory device that is not transitory. The memory device 76 may be configured to store information (e.g., images, video data, etc.), data, files, applications, instructions or the like for enabling the apparatus to carry out various functions in accordance with example embodiments of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, photographs, etc.).

The apparatus 50 may, according to some example embodiments, be a mobile terminal (for example, mobile terminal 10) or a fixed communication device or computing device configured to employ example embodiments of the invention. According to some example embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement embodiments of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In some example embodiments, the processor 70 may be configured to execute instructions stored in the memory device 76 or otherwise accessible to the processor 70. As such, whether configured by hardware or software methods, or by a combination thereof, the processor 70 may represent an entity (for example, physically embodied in circuitry) capable of performing operations according to embodiments of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (for example, a mobile terminal or network device) adapted for employing embodiments of the invention by further configuration of the processor 70 by instructions for performing the algorithms and operations described herein. The processor 70 may include, among other things, a clock, an arithmetic logic unit (ALU) and logic gates configured to support operation of the processor 70.

In some example embodiments, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

The communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In some example embodiments in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (for example, software and/or firmware) stored on a memory accessible to the processor 70 (for example, memory device 76, and/or the like).

The apparatus 50 may include a media capturing element, such as camera module 36. The camera module 36 may include a camera, video and/or audio module, in communication with the processor 70 and the display 85. The camera module 36 may be any means for capturing an image, video and/or audio for storage, display or transmission. For example, the camera module 36 may include a digital camera capable of forming a digital image file from a captured image. As such, the camera module 36 may include all hardware, such as a lens or other optical component(s), and software necessary for creating a digital image file from a captured image. Alternatively, the camera module 36 may include only the hardware needed to view an image, while a memory device (e.g., memory device 76) of the apparatus 50 stores instructions for execution by the processor 70 in the form of software necessary to create a digital image file from a captured image. In an example embodiment, the camera module 36 may further include a processing element such as a co-processor which assists the processor 70 in processing image data and an encoder and/or decoder for compressing and/or decompressing image data. The encoder and/or decoder may encode and/or decode according to a Joint Photographic Experts Group, (JPEG) standard format or another like format. In some cases, the camera module 36 may provide live image data to the display 85. In this regard, the camera module 36 may facilitate or provide a camera view to the display 85 to show live image data, still image data, video data, or any other suitable data. Moreover, in an example embodiment, the display 85 may be located on one side of the apparatus 50 and the camera module 36 may include a lens positioned on the opposite side of the apparatus 50 with respect to the display 85 to enable the camera module 36 to capture images on one side of the apparatus 50 and present a view of such images to the user positioned on the other side of the apparatus 50.

The face detector 61 may be any means such as a device or circuitry embodied in either hardware, a computer program product, or a combination of hardware and software that is configured to detect one or more faces. The face detector 61 may be in communication with the processor 70, the camera module 36 and the memory 76 (e.g., via the processor 70). In this regard, the face detector 61 may extract one or more features from one or more images, video data or the like captured by camera module 36 and based in part on the extracted features, the face detector 78 may determine whether the extracted features relate to a face(s) of an individual(s). Additionally, the face detector 61 may analyze data stored in the memory device to determine whether the memory device 76 stores face data relating to an individual(s). The face detector 61 may provide one or more detected faces to the pose estimator module 78 to enable the pose estimator module 78 to determine a pose of one or more detected faces, as described more fully below.

The apparatus 50 may optionally include a CCA module 54. The CCA module 54 may be any means such as a device or circuitry embodied in either hardware, a computer program product, or a combination of hardware and software that is configured to generate a CCA model associated with multiple poses that may be utilized in part to determine a pose(s) of a detected face(s), as described more fully below.

In some example embodiments, the processor 70 may be embodied as, include or otherwise control the pose estimator module 78. The pose estimator module 78 may be any means such as a device or circuitry operating in accordance with software or otherwise embodied in hardware or a combination of hardware and software (for example, processor 70 operating under software control, the processor 70 embodied as an ASIC or FPGA specifically configured to perform the operations described herein, or a combination thereof) thereby configuring the device or circuitry to perform the corresponding functions of the pose estimator module 78, as described below. Thus, in an example in which software is employed, a device or circuitry (for example, the processor 70 in one example) executing the software forms the structure associated with such means.

The pose estimator module 78 may analyze a detected object(s) (e.g., a face(s)) and determine a pose of the detected object. In this regard, for example, the pose estimator module 78 may analyze data of one or more detected faces and may estimate a pose of the detected faces, as described more fully below. The faces may be detected in one or more images (e.g., digital images, digital photographs, etc.), video data (e.g., videos, video clips, etc.) or the like by the face detector 61, which may provide the detected faces to the pose estimator module 78 for determining a pose of the detected faces.

Referring now to FIG. 3, a schematic block diagram of a pose estimator module is provided for determining a pose of one or more objects according to an example embodiment. In the example embodiment of FIG. 3, the pose estimator module 38 may be one example embodiment of the pose estimator module 78 of FIG. 2. The pose estimator module 38 may include a frontal face model 31, a tilt face model 33, a half profile face model 35, a full profile face module 37 and a maximum score detector 39 (also referred to herein as argmax 39). In this regard the frontal face model 31 may relate to a trained model for determining a frontal pose (also referred to herein as frontal face pose). The tilt face model 33 may relate to a trained model for determining a tilt pose (also referred to herein as tilt face pose). Additionally, the half profile face model 35 may correspond to a trained model for determining a half profile pose (also referred to herein as half profile face pose). In an example embodiment, the half profile face model 35 may, but need not, include a left half profile face model and a right half profile face model configured to determine one or more left half profile poses and/or one or more right half profile poses. In addition, the full profile face model 37 may correspond to a trained model for determining a full profile pose (also referred to herein as full profile face pose).

The frontal face model 31, the tilt face model 33, the half profile face model 35 and the full profile face model 37 may be provided with a face input of a detected face (e.g., a single detected face) from the face detector 61. The frontal face model 31, the tilt face model 33, the half profile face model 35 and the full profile face model 37 may be trained with a number of images of faces corresponding to respective poses. The frontal face model 31, the tilt face model 33, the half profile face model 35 and the full profile face model 37 may be trained with a set of respective poses and may be assigned respective predetermined thresholds for determining that a detected face corresponds to a respective pose. The predetermined thresholds utilized by the frontal face model 31, the tilt face model 33, the half profile face model 35 and the full profile face model 37 may, but need not, relate to different thresholds.

For purposes of illustration and not of limitation, the frontal face model 31 may, but need not, be trained with a set 1,000 poses of frontal faces and the frontal face model 31 may be assigned a predetermined threshold for determining that a detected face corresponds to a frontal face pose. For example, the predetermined threshold may, but need not, be defined to indicate that a face, detected by the face detector 61, that passes 99 out of 100 frontal poses (e.g., model frontal poses) of the frontal face model 31 may be determined, by the frontal face model 31, to correspond to a frontal pose. In an instance in which the frontal face model 31 may determine that the detected face meets or exceeds the predetermined threshold (e.g., passing 99 out of 100 frontal poses) for qualifying as a frontal pose, the frontal face model 31 may determine and may assign a confidence score to the detected face. The confidence score denoted $C_F$ may indicate the confidence of the frontal face model 31 that the detected face corresponds to a frontal pose. In this regard, the higher the score, the greater the confidence that the detected face corresponds to a frontal pose. On the other hand, the lower the confidence score, the lower the confidence that the detected face corresponds to a frontal pose. In an example embodiment, the confidence scores may be relate to values within a range from $-5^5$ to $+5^5$ or any other suitable range of values.

As another example, for purposes of illustration and not of limitation, the tilt face model 33 may be trained with a set of images (e.g., 1,000 images) corresponding to tilt poses and the tilt face model 33 may be assigned a predetermined threshold for determining that a detected face corresponds to a tilt pose. For example, the predetermined threshold may relate to criteria indicating that a detected face should pass a number (e.g., passing 95 out of 100 tilt poses (e.g., model tilt poses)) of tilt poses of the tilt face model 33 to qualify as a tilt pose. In an instance in which the tilt face model 33 determines that the detected face meets the predetermined threshold the tilt face model 33 may assign a confidence score to the detected face. The confidence score denoted $C_T$ may indicate the level of confidence that the tilt face model 33 has that the detected face relates to a tilt face pose.

In a similar manner, the half profile face model 35 may be trained with a set of images and may be assigned a predetermined threshold for determining whether a detected face, provided by the face detector 61, corresponds to a half profile face pose. In response to the half profile face model 35 determining that the detected face meets or exceeds the predetermined threshold, the half profile face model 35 may determine and may assign a confidence score denoted by $C_{HP}$ to the detected face indicating a level of confidence that the detected face corresponds to a half profile face pose.

In an analogous manner, the full profile face model 37 may be trained with a set of images and may be assigned a predetermined threshold for determining whether a detected face, provided by the face detector 61, corresponds to a full profile face pose. In response to the full profile face model 37 determining that the detected face meets or exceeds the predetermined threshold, the full profile face model 37 may determine and may assign a confidence score denoted by $C_{FP}$ to the detected face indicating a level of confidence that the detected face corresponds to a full profile face pose.

As an example in which the pose estimator module 38 may determine a pose of a detected face, consider an instance in which, a detected face, received from the face detector 61, may be input to the frontal face model 31, the tilt face model 33, the half profile model 35 and the full profile face model 37. In this example, presume that the frontal face model 31, the tilt face model 33, the half profile model 35 and the full profile face model 37 each determined that the detected face met the respective predetermined thresholds for qualifying as a frontal pose, tilt face pose, half profile model pose, and full profile pose, respectively. In this regard, consider further, for example, that the frontal face model 31 determined and assigned a confidence score $C_F$ of 5,000 that the detected face corresponds to a frontal pose and the tilt face model 33 determined and assigned a confidence score $C_T$ of 1,000 that the detected face corresponds to a tilt face pose. In addition, consider further that the half profile face model 35 determined and assigned a confidence score of -1,000 that the detected face corresponds to a half profile pose. Moreover, presume that the full profile face model determined and assigned a confidence score of -10,000 that the detected face corresponds to a full profile face pose.

In this regard, each of the respective confidence scores may be provided by the models 31, 33, 35, 37 to the maximum score detector 39 which may determine or estimate that the final pose equals the maximum of the confidence scores $C_F$, $C_T$, $C_{HP}$ and $C_{FP}$ (e.g., max($C_F$, $C_T$, $C_{HP}$, $C_{FP}$)). In this example embodiment, the maximum score detector 39 may determine that the pose of the detected face corresponds to a frontal pose since the confidence score $C_F$ (e.g., 5,000) is higher than confidence scores $C_T$, $C_{HP}$ and $C_{FP}$.

Referring now to FIG. 4, a schematic block diagram of another pose estimator module is provided for determining a pose of one or more objects according to an alternative example embodiment. In the example embodiment of FIG. 4, the pose estimator module 48 may be one embodiment of the pose estimator module 78 of FIG. 2. The pose estimator module 48 may include a multiple face candidate generator 41, a frontal face model 43, a tilt face model 45, a half profile face model 47, a full profile face module 49 and a highest value detector 46 (also referred to herein as argmax 46). In the example embodiment of FIG. 4, the frontal face model 43 may be trained in a manner analogous to the frontal face model 31 of FIG. 3. The tilt face model 45 may be trained in a manner analogous to the tilt face model 33 of FIG. 3 and the half profile face model 47 may be trained in a manner analogous to the half profile face module 35 of FIG. 3. Additionally, the full profile face model 49 may be trained in a manner analogous to the full profile face model 37 of FIG. 3.

The multiple face candidate generator 41 may receive an input of a detected face(s) from the face detector 61 and may generate one or more additional faces based on the received detected face. For example, the multiple face candidate generator 41 may receive the detected face from the face detector 61 and may generate multiple faces based on performing row shifts and column shifts of pixels of the original detected image to generate N number of face samples (e.g., $F_1$, $F_2$, . . . $F_N$) from the original detected face.

Each of the multiple generated faces (also referred to herein as N faces) may be provided by the multiple face candidate generator 41 to the frontal face model 43, the tilt face model 45, the half profile face model 47 and the full profile face model 49. In this regard, the frontal face model 43, the tilt face model 45, the half profile face model 47 and the full profile face model 49 may analyze each of the N faces and may determine the number of N faces that pass the criteria (also referred to herein as criterion, or a condition(s)) for corresponding to a respective pose. The criteria may relate to respective predetermined thresholds for determining whether a face passes or qualifies as a pose corresponding to a model. For purposes of illustration and not of limitation, the frontal face model 43 may analyze each of the N faces generated by the multiple face candidate generator 41 and may determine whether each of the faces meets or exceeds a predetermined threshold (e.g., passes 99 out of 100 frontal poses (e.g., frontal pose models) for qualifying as passing as a frontal pose.

The tilt face model 45, the half profile face model 47 and the full profile face model 49 may determine whether a candidate face of the N faces passes as qualifying as a tilt pose, a half profile pose, and a full profile pose, respectively in an analogous manner.

In this example embodiment, $N_p$ may denote the number of successfully passed candidates by a model of pose p, where p may be one of the possible poses. The pose estimator module 48 may determine that the pose model which has a highest value of $N_p$ is determined to be the pose of the detected face.

As such, the highest value detector 46 may determine that the final pose $p=\text{argmax}(N_p)$ for all $p \in [F, T, HP, FP \text{ poses}]$ where F denotes a frontal pose, T denotes a tilt pose, HP denotes a half profile pose and FP denotes a full profile pose and where K may be a value of a possible number of poses used in a framework and $n_p$ may be the number of successfully passed candidates by a pose model p.

For purposes of illustration and not of limitation, consider an example in which the multiple face candidate generator 41 generated a set of 10 candidate faces (e.g., N faces=10) and that the frontal face model 43 determined that 9 out of the 10 faces passed the criteria (e.g., a predetermined threshold) for qualifying as a frontal pose. As such, the frontal face model 43 may assign a score $N_F$ of 9 to the set of candidate faces (e.g., N faces). Presume further that the tilt face model 45 determined that 3 out of the 10 faces passed the criteria for qualifying as a tilt pose and assigned a score $N_T$ of 3 to the set of candidate faces. Also, consider further that the half profile face model 47 determined that 2 out of the 10 faces passed the criteria for qualifying as a half profile pose and assigned a score $N_{HP}$ of 2 to the set of candidate faces. In this example embodiment, presume further that the full profile face model 49 determined that 0 out of 10 faces passed the criteria for qualifying as a full profile pose and assigned a score $N_{FP}$ of 0 to the set of candidate faces.

In this regard, each of the models 43, 45, 47 and 49 may provide the scores (e.g., $N_F$, $N_T$, $N_{HP}$, $N_{FP}$), to the highest value detector 46 and the highest value detector 46 may analyze the values associated with the scores and may determine that $N_F$ has the highest value (e.g., 9). As such, the highest value detector 46 may determine that the image of the detected face received by the multiple face candidate generator 41 corresponds to a frontal pose. It should be pointed out that in the example embodiment of FIG. 4, the scores may range from a value of 0 to N.

Referring now to FIG. 5, a schematic block diagram of another pose estimator module is provided for determining a pose of one or more objects according to an alternative example embodiment. In the example embodiment of FIG. 5, the pose estimator module 58 may be one example embodiment of the pose estimator module 78 of FIG. 2. The pose estimator module 58 may include a multiple face candidate generator 51, a frontal face model 53, a tilt face model 55, a half profile face model 57, a full profile face module 59 and a maximum value detector 56 (also referred to herein as argmax 56). In the example embodiment of FIG. 5, the frontal face model 53 may be trained in a manner analogous to the frontal face model 31 of FIG. 3. The tilt face model 55 may be trained in a manner analogous that tilt face model 33 of FIG. 3 and the half profile face model 57 may be trained in a manner analogous to the half profile face module 35 of FIG. 3. Additionally, the full profile face model 59 may be trained in a manner analogous to the full profile face model 37 of FIG. 3. The multiple face candidate generator 51 may generate one or more candidate faces (e.g., N faces) based on receipt of input of a detected face image from the face detector 61 in a manner analogous to that described above with respect to the multiple face candidate generator 41. For example, the multiple face candidate generator 51 may generate one or more candidate faces (e.g., $F_1, F_2, F_3, \ldots F_N$) based in part on performing row shifts and column shifts or the like of at least a portion of the pixels of the detected face image received from the face detector 61.

In the example embodiment of FIG. 5, the multiple face candidate generator 41 may provide the multiple generated set of candidate face samples (e.g., N face samples) to the frontal face model 53, the tilt face model 55, the half profile face model 57, and the full profile face model 59. In this regard, each of the models 53, 55, 57 and 59 may determine whether every received face sample of the set of candidate faces (e.g., N face samples) passes the criteria (e.g., a predetermined threshold) for qualifying as a corresponding pose associated with the models. For instance, the frontal face model 53 may determine whether each of the candidate faces received from the multiple face candidate generator 51 passes the criteria for qualifying as a frontal pose. The tilt face model 55 may determine whether each of the candidate faces received from the multiple face candidate generator 51 passes the criteria for qualifying as a tilt pose. Similarly, the half profile face model 57 may determine whether each of the candidate faces received from the multiple face candidate generator 51 passes the criteria for qualifying as a half profile pose. In addition, the full profile face model 59 may determine whether each of the candidate faces received from the multiple face candidate generator 51 passes the criteria for qualifying as a full profile face model.

In an instance in which the models may determine that each candidate face sample i (e.g., where i may vary from 1 to N) passes the criteria for a pose p associated with the respective models, the respective models may generate a confidence score ($c_{pi}$) of the face sample. Each of the models 53, 55, 57, 59 may total the confidence scores for each candidate face sample i of the set of candidate faces received from the multiple face candidate generator 51 that passes the criteria to obtain a total or final confidence score for the corresponding model.

In this regard, the final confidence score for each pose associated with a corresponding model (e.g., frontal face model 53, tilt face model 55, half profile face model 57, full profile face model 59) may be computed by each of the models 53, 55, 57, 59 by utilizing the confidence of pose p and performing $C_p = \Sigma(C_{pi})$, for all $i \in [1, N_p]$, and for all $p \in [F, T, HP, FP \text{ poses}]$ where F denotes a frontal pose, T denotes a tilt pose, HP denotes a half profile pose, FP denotes a full profile pose and where $c_{pi}=0$ for the candidate face sample which may fail to pass a model of pose p.

The final pose of the detected face provided to the pose estimation module 58 by the face detector 61 may be determined by the maximum value detector 56 based on the maximum value of confidence scores of a pose model $c_p$ in which the Final Pose $p = \text{argmax}(C_p)$ for all $p \in [F, T, HP, FP \text{ poses}]$.

For purposes of illustration and not of limitation, presume that the multiple face candidate generator 51 generated a set of 10 candidate face samples from the detected face image received from the face detector 61. Each of these 10 candidate face samples may be provided to the face frontal model 53, the tilt face model 55, the half profile face model 57 and the full profile face model 59. Presume further that each of the models 53, 55, 57, 59 determined that every candidate face sample passed the corresponding criteria as qualifying for a respective pose (e.g., a frontal pose, a tilt pose, a half profile pose, a full profile pose). In this regard, each of the models 53, 55, 57, 59 may determine a confidence score for each of the 10 candidate face samples and may add the total of the candidate scores to obtain a final or total candidate score of the set. As such, presume that frontal face model 53 determined that the total candidate score $C_F$ is a value of 5,500 and that the tilt face model 55 determined that the total candidate score $C_T$ is a value of 1,000. Presume further that the half profile face model 57 determined that the total candidate score $C_{HP}$ is a value of −1,000 and that the full profile face model determined that the total confidence score $C_{FP}$ is a value of −5,000. In this regard, the models 53, 55, 57, 59 may provide the total confidence scores to the maximum value detector 56. As such, the maximum value detector 56 may analyze the total confidence scores $C_F$, $C_T$, $C_{HP}$, $C_{FP}$ and may determine that the detected face provided to the pose estimator module 58 by the face detector 61 is a frontal face based on the value of $C_F$ (e.g., 5,500) being greater than the values of $C_T$, $C_{HP}$, and $C_{FP}$.

Referring to now to FIG. 6, a schematic block diagram of a Canonical Correlation Analysis (CCA) module is provided according to an example embodiment. In one example embodiment, the CCA module 64 may correspond to the CCA module 54 of FIG. 2. The CCA module 64 may utilize a CCA classification model, in which one or more poses may be implemented including, but not limited to, frontal poses, left half profile poses, left full profile poses, right half profile poses, right full profile poses, etc. (e.g., tilt poses). The CCA classification model and the poses may be utilized during a training process to generate a CCA model. The generated CCA model may be utilized in part to determine a pose of a detected face, as described more fully below. In order to generate the CCA model, the processor 63 (e.g., processor 70) may generate one or more labels for the purpose of both training and/or testing of one or more images of faces. In this regard, the processor 63 may generate a label for each of the different poses corresponding to a frontal pose, a left half profile pose, a right half profile pose, a left full profile pose, a right full profile pose and any other suitable poses (e.g., a tilt pose).

For example, the processor 63 may generate a label such as, for example, a binary digit label 1 0 0 0 0 for a frontal pose that may be assigned by the processor 63 during the training process. The processor 63 may generate a label such as, for example, a binary digit label 0 1 0 0 0 for a left half profile pose that may be assigned by the processor 63 during the training process. The processor 63 may generate a label such as, for example, a binary digit label 0 0 1 0 0 for a right half profile pose that may be assigned by the processor 63 during the training process. The processor 63 may generate a label such as, for example, a binary digit label 0 0 0 1 0 for a left full profile pose that may be assigned by the processor 63 during the training process. Additionally, the processor 63 may generate a label such as, for example, a binary digit label 0 0 0 0 1 for a right full profile pose that may be assigned by the processor 63 during the training process.

The processor 63 may store the generated labels corresponding to respective poses in the memory device 62. In addition, the memory device 62 may also store a number of model poses corresponding to images of a number of faces (e.g., images of 1,000 faces corresponding to a given pose (e.g., frontal pose)). For example, in order to train the CCA model each of the respective poses (e.g., frontal pose, left half profile pose, right half profile pose, left full profile pose, right full profile pose, etc.) may be associated with a number images of faces (e.g., 1,000 faces). As such, for example, for frontal poses the memory device 62 may store a number of images of faces (e.g., 1,000 faces). Also, for example, for left half profile poses, the memory device 62 may store a number of images of faces (e.g., 1,000 faces) and for right half profile poses, the memory device 62 may store a number of images of faces (e.g., 1,000 faces) so on and so forth for the left full profile poses and the right full profile poses.

In the example embodiment of FIG. 6, for each of the images of the faces corresponding to respective poses, the processor 63 may determine the applicable label to be applied and may assign the corresponding label to the respective image of the face(s) being examined. For example, the processor 63 may receive one or more images from memory 62 and may assign a label such as 1 0 0 0 0 to images corresponding to frontal poses, and may assign a label such as 0 1 0 0 0 to images corresponding to left half profile poses. Similarly, the processor 63 may receive one or more images from memory device 62 and may assign a label such as, for example, 0 0 1 0 0 to images corresponding to right half profile poses and may assign a label such as, for example, 0 0 0 1 0 to images corresponding to left full profile poses. In addition, the processor 63 may receive one or more images from memory device 62 and may assign a label such as, for example, 0 0 0 0 1 to images corresponding to right full profile poses.

In response to the processor 63 assigning the images corresponding to respective poses labels, the local binary pattern (LBP) histogram module 65 may convert the gray level image data of the images (e.g., images of faces corresponding to a pose(s)) to a local binary pattern. In this regard, images with the LBP features may be more accurate than if they remained as gray level image data.

The CCA training device 68 may analyze the images with the LBP histogram features generated by the LBP histogram module 65 and may generate a CCA model that may be configured to support multiple classes of poses. For example, the classes of poses may include, but are not limited to, frontal, left half profile, right half profile, left full profile, right full profile, etc. In this regard, the CCA training device 68 may generate a single model capable of supporting multiple different classes of poses. By utilizing a single model supporting multiple classes of poses to determine a pose of an object (e.g., a face(s)), the CCA module 64 may provide a less complex computational approach for determining a pose of an object. Providing a less computational technique for determining a pose may be beneficial to conserve processing resources and memory bandwidth, etc.

In an example embodiment, the processor 63 may be embodied as, include or otherwise control the LBP histogram module 65 and the CCA training device 68. The LBP histogram module 65 and the CCA training device 68 may be any means such as a device or circuitry operating in accordance with software or otherwise embodied in hardware or a combination of hardware and software (e.g., processor 63 operating under software control, the processor 63 embodied as an ASIC or FPGA specifically configured to perform the operations described herein, or a combination thereof) thereby configuring the device or circuitry to perform the corresponding functions of the LBP histogram module 65 and the CCA training device 68, respectively, as described herein. Thus, in an example in which software is employed, a device or circuitry (e.g., the processor 63 in one example) executing the software forms the structure associated with such means.

Referring now to FIG. 7, a schematic block diagram of a pose estimator module is provided according to an alternative example embodiment of the invention. In one example embodiment, the pose estimator module 71 may correspond to the pose estimator 78 of FIG. 2. The pose estimator module 71 may include a LBP histogram module 73 and a CCA detector 75. The CCA detector 75 may receive the CCA model from the CCA training device 68 of FIG. 6. In this regard, the CCA detector 75 may utilize the CCA model in part to determine one or more poses of one or more objects (e.g., faces) of an image(s), as described more fully below.

The pose estimator module 71 may receive a detected face(s) image from the face detector 61. In response to receipt of the detected face(s) image from the face detector 61, the LBP histogram module 75 may convert the gray level image data of the detected face image to LBP features. In this regard, the features of the detected face image may be more accurate. The CCA detector 75 may analyze the detected face image with the LBP features generated by the LBP histogram module 73. In addition, the CCA detector 75 may compare the face image received from the LBP histogram module 73 to data of the CCA model and may determine which pose, among the frontal pose, left half profile pose, right half profile pose, left full profile pose, right full profile pose, etc., that the face image matches or corresponds to the best (e.g., that the image matches most accurately). In response to determining the pose that the image received from the LBP histogram module 73 corresponds to, the CCA detector 75 may assign the corresponding label for the particular pose to the image. For example, in an instance in which the CCA detector 75 determines that the image received from the LBP histogram module 73 relates (e.g., best matches) to a frontal pose, the CCA detector 75 may assign the pose label 1 0 0 0 0 corresponding to the frontal pose label to the image. In this regard, the CCA detector 75 may utilize the data of the CCA model to determine that the detected image received from the face detector 61 relates a frontal pose of a face.

Referring now to FIG. 8, a schematic block diagram of a pose estimator module is provided according to an alternative example embodiment of the invention. In one example embodiment, the pose estimator module 88 may correspond to the pose estimator module 78 of FIG. 2. The pose estimator module 88 may include a multiple face candidate generator 81, a CCA detector 83, and a pose angle with maximum vote module 85. In the example embodiment of FIG. 8, the CCA detector 83 may receive the CCA model from the CCA training device 68 of FIG. 6. In this regard, the CCA detector 83 may utilize the CCA model in part to determine a pose(s) of one or more detected faces, as described more fully below.

In the example embodiment of FIG. 8, a detected face may be received by the multiple candidate face generator 81 from the face detector 61. The multiple candidate face generator 81 may generate multiple face sample images based on performing row shifts, column shifts and the like associated with pixels of the detected image received from face detector 61. In this regard, the multiple face candidate generator 81 may generate N faces (also referred to herein as N face samples) samples (e.g., $F_1, F_2, F_3, \ldots F_N$) based on the detected face. The N faces may be provided to the CCA detector 83. The CCA detector 83 may analyze data of the N faces and data of the CCA model to determine which poses the N faces match or correspond to the best. In this regard, the CCA detector 83 may determine a pose for each of the N faces and may assign a corresponding pose label (e.g., 1 0 0 0 0, 0 1 0 0 0, 0 0 1 0 0, etc.) to the N faces. The determined pose for each of the N faces may be output by the CCA detector 83 and provided to the pose angle with maximum vote module 85. The designated pose among the N faces that corresponds to the highest number of N faces may be determined, by the pose angle with maximum vote module 85 to be the pose of the detected face received from the face detector 61.

As such, the pose angle with maximum vote module 85 may determine that the detected or final pose p=argmax(p1, p2, p3, . . . pn) for all p∈[1, K] and n C∈[1, J] where K may denote the value of possible number of poses used in a framework and J may denote the number of times the model is used to obtain a voting candidate.

For purposes of illustration and not of limitation, consider an instance in which the multiple candidate face generator 81 generated five faces (e.g., N=5). The CCA detector 83 may determine that Face 1 corresponds to a frontal pose, Face 2 corresponds to a frontal pose, Face 3 corresponds to a frontal pose, Face 4 corresponds to a right half profile pose and Face 5 corresponds to a left half profile pose. In this regard, the CCA detector 83 may assign labels to the corresponding Faces (e.g., the five Faces) in which the labels may denote the determined pose for each of the five faces. The CCA detector 83 may output the determined poses of the five faces to the pose angle with maximum vote module 85. The pose angle with maximum vote module 85 may determine that the pose of the detected image of the face received from the face detector 61 corresponds to the pose that is assigned to the highest number of the five faces. As such, in this example embodiment, the pose angle with maximum vote module 85 may determine that the pose of the detected image of the face received from the face detector 61 corresponds to the frontal pose, since three of the five faces were determined to relate to the frontal pose.

In one example embodiment, by utilizing the pose estimator module 88 a pose detection accuracy of around 93% may be obtained based on part on utilizing the CCA model of an example embodiment as opposed to accuracy of only around 65% for conventional pose estimator devices. In an alternative example embodiment, the CCA detector 75 and/or CCA detector 83 may utilize confidence information in terms of actual values of the generated pose labels.

Referring now to FIG. 9, a flowchart of an example method for determining a pose of an object is provided. At operation 900, an apparatus (e.g., pose estimator module 78) may receive a detected image of at least one face. The detected image may be received from a face detector device (e.g., face detector 61). At operation 905, the apparatus (e.g., pose estimator module 78) may analyze the image of the at least one face based on data of at least one model (also referred to herein as a layer(s)) identifying one or more poses (e.g., a frontal pose, a tilt pose, a right half profile pose, a left half profile pose, a right full profile pose, a left full profile pose, etc.). The poses may relate in part to at least one of a position or an orientation of respective faces.

At operation 910, the apparatus (e.g., pose estimator module 78) may determine that the face corresponds to one of the poses (e.g., a frontal pose) based in part on one or more items of data of the image passing criteria identified by the model as corresponding to the pose.

It should be pointed out that FIG. 9 is a flowchart of a system, method and computer program product according to some example embodiments of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in some example embodiments, the computer program instructions which embody the procedures described above are stored by a memory device (for example, memory device 76, memory device 62) and executed by a processor (for example, processor 70, pose estimator module 78). As will be appreciated, any such computer program instructions may be loaded onto a computer or other programmable apparatus (for example, hardware) to produce a machine, such that the instructions which execute on the computer or other programmable apparatus cause the functions specified in the flowchart blocks to be implemented. In some example embodiments, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some example embodiments, an apparatus for performing the method of FIG. 9 above may comprise a processor (for example, the processor 70, the pose estimator module 78) configured to perform some or each of the operations (900-910) described above. The processor may, for example, be configured to perform the operations (900-910) by performing hardware implemented logical functions, executing stored instructions, or executing algorithms for performing each of the operations. Alternatively, the apparatus may comprise means for performing each of the operations described above. In this regard, according to some example embodiments, examples of means for performing operations (900-910) may comprise, for example, the processor 70 (for example, as means for performing any of the operations described above), the pose estimator module 78 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different terms are employed herein, they are used in a generic and descriptive sense only and not for purposes of limitation.

The invention claimed is:

1. A method comprising:
    receiving a detected image of at least one face;
    generating a plurality of candidate face images based on the detected image, wherein a candidate face image is generated based on one or more of row or column shifts of pixels of the detected image;
    analyzing the candidate face images based on data of at least one model identifying one or more poses related in part to at least one of a position or an orientation of respective candidate face images; and
    determining that the image of at least one face corresponds to one of the poses based in part on one or more items of data of the candidate face images passing criteria identified by the model as corresponding to the pose.

2. The method of claim 1
    wherein the at least one model comprises a plurality of models, each of the models corresponding to a respective pose, of a plurality of poses;
    wherein analyzing the candidate face images further comprises analyzing each of the candidate face images to determine whether the candidate face images passes criterion established for each of the models; and
    wherein determining that the image of at least one face corresponds to one of the poses further comprises determining, for each of the models, a total number of the candidate face images that pass the criterion.

3. The method of claim 2,
    wherein determining that the image of at least one face corresponds to one of the poses comprises determining a pose of the at least one face of the detected image that corresponds to a respective pose of a corresponding model in which a highest number of the candidate face images passed the criterion.

4. The method of claim 1, wherein the at least one model comprises a plurality of models, each of the models corresponding to a respective pose of a plurality of poses, wherein analyzing the image of the at least one face based on data of at least one model comprises analyzing the detected image based in part on data of each of the models, the method further comprising:
    determining, for each of the models, whether the detected image passes at least one condition for a respective pose of the poses; and
    calculating one or more confidence scores associated with each of the models in response to determining that the detected image passed the condition for the respective pose.

5. The method of claim 1, wherein the at least one model comprises a plurality of models, each of the models corresponding to a respective pose of a plurality of poses, wherein analyzing the candidate face images based on data of at least one model comprises analyzing each of the candidate face images to determine whether each candidate face images passes criterion established for each of the models, the method further comprising:
    determining, for each of the models, a confidence score for each of the candidate face images that passed the criterion.

6. The method of claim 5, further comprising:
    adding each of the confidence scores corresponding to the models to obtain a plurality of total confidence scores, each of the total confidence scores corresponding to a respective model of the models; wherein determining that the image of at least one face corresponds to one of the poses further comprises determining that a pose of the image of at least one face corresponds to a respective pose of a corresponding model that is determined to comprise a highest total confidence score of the total confidence scores.

7. The method of claim 1, wherein the at least one model comprises a canonical correlation analysis model corresponding to a plurality of poses, each of the poses assigned a corresponding label, wherein analyzing the candidate face images based on data of at least one model comprises analyzing data of the detected image and data associated with the poses to determine whether the detected image corresponds to one of the poses, the method further comprising:
assigning a label of a corresponding pose to the detected image in response to determining that the detected image is associated with the corresponding pose;
wherein determining that the image of at least one face corresponds to one of the poses is based in part on determining that a pose of the face relates to the corresponding pose based at least in part on a value of the assigned label.

8. The method of claim 1, wherein the at least one model comprises a canonical correlation analysis model corresponding to a plurality of poses, each of the poses assigned a corresponding label of a plurality of labels, the method further comprising:
assigning a respective label of the labels to each of the candidate face images that are determined to be related in part to at least one of the poses.

9. An apparatus comprising:
at least one processor; and
at least one memory including computer program code configured to, with the at least one processor, cause the apparatus to perform at least the following:
receive a detected image of at least one face;
generate a plurality of candidate face images based on the detected image, wherein a candidate face image is generated based on one or more of row or column shifts of pixels of the detected image;
analyze the candidate face images based on data of at one model identifying one or more poses related in part to at least one of a position or an orientation of respective candidate face images; and
determine that the image of at least one face corresponds to one of the poses based in part on one or more items of data of the candidate face images passing criteria identified by the model as corresponding to the pose.

10. The apparatus of claim 9, wherein the at least one model comprises a plurality of models, each of the models corresponding to a respective pose, of a plurality of poses;
wherein causing the apparatus to analyze the candidate face images further comprises causing the apparatus to analyze each of the candidate face images to determine whether the candidate face images passes criterion established for each of the models; and
wherein causing the apparatus to determine that the image of at least one face corresponds to one of the poses further comprises causing the apparatus to determine, for each of the models, a total number of the candidate face images that pass the criterion.

11. The apparatus of claim 10,
wherein causing the apparatus to determine that the image of at least one face corresponds to one of the poses comprises causing the apparatus to determine a pose of the at least one face of the detected image that corresponds to a respective pose of a corresponding model in which a highest number of the candidate face images passed the criterion.

12. The apparatus of claim 10, wherein the plurality of poses comprises at least one of a frontal pose, a tilt pose, a right half profile pose, a left half profile pose, a right full profile pose or a left full profile pose.

13. The apparatus of claim 9, wherein the at least one model comprises a plurality of models, each of the models corresponding to a respective pose of a plurality of poses, and
wherein causing the apparatus to analyze the image of the at least one face based on data of at least one model comprises causing the apparatus to analyze the detected image based in part on data of each of the models, wherein the memory and computer program code are further configured to, with the processor, cause the apparatus to:
determine, for each of the models, whether the detected image passes at least one condition for a respective pose of the poses; and
calculate one or more confidence scores associated with each of the models in response to determining that the detected image passed the condition for the respective pose.

14. The apparatus of claim 13, wherein the memory and computer program code are configured to, with the processor, cause the apparatus to:
determine that a pose of the face corresponds to a respective pose of a corresponding model assigned a highest confidence score of the confidence scores.

15. The apparatus of claim 9,
wherein the at least one model comprises a plurality of models, each of the models corresponding to a respective pose of a plurality of poses, wherein causing the apparatus to analyze the candidate face images based on data of at least one model comprises causing the apparatus to analyze each of the candidate face images to determine whether each candidate face images passes criterion established for each of the models, wherein the apparatus is further caused to:
determine, for each of the models, a confidence score for each of the candidate face images that passed the criterion.

16. The apparatus of claim 15, wherein the memory and computer program code are configured to, with the processor, cause the apparatus to:
add each of the confidence scores corresponding to the models to obtain a plurality of total confidence scores, each of the total confidence scores corresponding to a respective model of the models, wherein causing the apparatus to determine that a pose of the image of at least one face corresponds to a respective pose of a corresponding model that is determined to comprise a highest total confidence score among the total confidence scores.

17. The apparatus of claim 9, wherein the at least one model comprises a canonical correlation analysis model corresponding to a plurality of poses, each of the poses assigned a corresponding label, wherein causing the apparatus to analyze the candidate face images based on data of at least one model comprises causing the apparatus to analyze data of the detected image and data associated with the poses to determine whether the detected image corresponds to one of the poses, wherein the apparatus is further caused to:
assign a label of a corresponding pose to the detected image in response to determining that the detected image is associated with the corresponding pose;
wherein causing the apparatus to determine that the image of at least one face corresponds to one of the poses is based in part on causing the apparatus to determine that a pose of the face relates to the corresponding pose based at least in part on a value of the assigned label.

18. The apparatus of claim 9, wherein the at least one model comprises a canonical correlation analysis model corresponding to a plurality of poses, each of the poses assigned a corresponding label of a plurality of labels, and wherein the memory and computer program code are configured to, with the processor, cause the apparatus to:

assign a respective label of the labels to each of the candidate face images that are determined to be related in part to at least one of the poses.

19. The apparatus of claim 18, wherein a value of the assigned label denotes that the candidate face images correspond to a type of pose and wherein the memory and computer program code are configured to, with the processor, cause the apparatus to:
determine that a pose of the face comprises a pose that is determined to correspond to a highest number of the candidate face images.

20. A computer program product comprising at least one non-transitory computer-readable storage medium having computer-readable program code portions stored therein, the computer-readable program code portions comprising:
program code instructions configured to facilitate receipt of a detected image of at least one face;
program code instructions to generate a plurality of candidate face images based on the detected image, wherein a candidate face image is generated based on one or more of row or column shifts of pixels of the detected image;
program code instructions configured to analyze the candidate face images based on data of at least one model identifying one or more poses related in part to at least one of a position or an orientation of respective candidate face images; and
program code instructions configured to determine that the image of at least one face corresponds to one of the poses based in part on one or more items of data of the candidate face images passing criteria identified by the model as corresponding to the pose.

* * * * *